(12) United States Patent
Liu et al.

(10) Patent No.: US 12,217,466 B2
(45) Date of Patent: Feb. 4, 2025

(54) PORTRAIT STYLIZATION FRAMEWORK TO CONTROL THE SIMILARITY BETWEEN STYLIZED PORTRAITS AND ORIGINAL PHOTO

(71) Applicant: Lemon Inc., Grand Cayman (KY)

(72) Inventors: Jing Liu, Los Angeles, CA (US); Chunpong Lai, Los Angeles, CA (US); Guoxian Song, Singapore (SG); Linjie Luo, Los Angeles, CA (US)

(73) Assignee: LEMON, INC., Grand Cayman (KY)

( * ) Notice: Subject to any disclaimer, the term of this patent is extended or adjusted under 35 U.S.C. 154(b) by 518 days.

(21) Appl. No.: 17/519,711

(22) Filed: Nov. 5, 2021

(65) Prior Publication Data

US 2023/0146676 A1 May 11, 2023

(51) Int. Cl.
*G06K 9/00* (2022.01)
*G06N 3/08* (2023.01)
(Continued)

(52) U.S. Cl.
CPC .............. *G06T 9/002* (2013.01); *G06N 3/08* (2013.01); *G06T 11/60* (2013.01)

(58) Field of Classification Search
CPC ......... G06T 9/002; G06T 11/60; G06T 11/00; G06T 11/001; G06T 5/50; G06T 2207/20081; G06T 2207/20084; G06T 2207/20221; G06T 2207/30201; G06T 2200/24; G06T 3/00; G06T 3/04;
(Continued)

(56) References Cited

U.S. PATENT DOCUMENTS

2018/0247201 A1  8/2018  Liu et al.
2019/0340753 A1  11/2019  Brestel et al.
(Continued)

FOREIGN PATENT DOCUMENTS

CN   111402179 A    7/2020
CN   111784787 A    10/2020
WO   2019118990 A1  6/2019

OTHER PUBLICATIONS

Gu, Jinjin, Yujun Shen, and Bolei Zhou. "Image processing using multi-code gan prior." Proceedings of the IEEE/CVF conference on computer vision and pattern recognition. 2020, pp. 3009-3018 (Year: 2020).*

(Continued)

*Primary Examiner* — Alex Kok S Liew
(74) *Attorney, Agent, or Firm* — Faegre Drinker Biddle & Reath LLP

(57) ABSTRACT

Systems and methods directed to controlling the similarity between stylized portraits and an original photo are described. In examples, an input image is received and encoded using a variational autoencoder to generate a latent vector. The latent vector may be blended with latent vectors that best represent a face in the original user portrait image. The resulting blended latent vector may be provided to a generative adversarial network (GAN) generator to generate a controlled stylized image. In examples, one or more layers of the stylized GAN generator may be swapped with one or more layers of the original GAN generator. Accordingly, a user can interactively determine how much stylization vs. personalization should be included in a resulting stylized portrait.

20 Claims, 6 Drawing Sheets

(51) Int. Cl.
 *G06T 9/00* (2006.01)
 *G06T 11/60* (2006.01)
(58) Field of Classification Search
 CPC . G06T 5/60; G06N 3/08; G06N 3/045; G06N 3/047; G06N 3/088; G06N 3/0475; G06N 3/0455; G06N 3/084; G06N 3/094
 See application file for complete search history.

(56) References Cited

U.S. PATENT DOCUMENTS

| | | | |
|---|---|---|---|
| 2020/0151559 A1* | 5/2020 | Karras | G06N 3/047 |
| 2020/0151938 A1 | 5/2020 | Shechtman et al. | |
| 2020/0356591 A1* | 11/2020 | Yada | G06F 16/5862 |
| 2021/0150357 A1* | 5/2021 | Karras | G06N 3/08 |
| 2022/0004809 A1* | 1/2022 | Iyer | G06F 18/40 |
| 2022/0092411 A1* | 3/2022 | Shin | G06N 3/08 |
| 2022/0122307 A1* | 4/2022 | Kalarot | G06T 3/4038 |
| 2022/0148241 A1* | 5/2022 | Park | G06T 5/60 |
| 2022/0148243 A1* | 5/2022 | Yang | G06F 16/532 |
| 2022/0164921 A1* | 5/2022 | Noh | G06N 3/08 |
| 2022/0207355 A1* | 6/2022 | Demyanov | G06N 3/045 |
| 2022/0270310 A1* | 8/2022 | Kumar | G06N 3/047 |

OTHER PUBLICATIONS

Park, Taesung, et al. "Swapping autoencoder for deep image manipulation." Advances in Neural Information Processing Systems 33 (2020), pp. 1-14 (Year: 2020).*

Liu, Mingcong, et al. "BlendGAN: Implicitly GAN Blending for Arbitrary Stylized Face Generation." arXiv preprint arXiv:2110.11728 (Oct. 22, 2021), pp. 1-22 (Year: 2021).*

Vahdat, Arash, and Jan Kautz. "NVAE: a Deep Hierarchical Variational Autoencoder." arXiv preprint arXiv:2007.03898 (Jan. 8, 2021), pp. 1-21 (Year: 2021).*

Song, Guoxian, et al. "Agilegan: stylizing portraits by inversion-consistent transfer learning." ACM Transactions on Graphics (TOG) 40.4 (Aug. 2021), pp. 1-13. (Year: 2021).*

Kim, Hyunsu, et al. "Exploiting Spatial Dimensions of Latent in GAN for Real-time Image Editing." arXiv preprint arXiv:2104.14754 (Jun. 23, 2021). (Year: 2021).*

Zhu, Peihao, et al. "Barbershop: Gan-based image compositing using segmentation masks." arXiv preprint arXiv:2106.01505 (Oct. 16, 2021), pp. 1-17 (Year: 2021).*

Richardson, Elad, et al. "Encoding in Style: a StyleGAN Encoder for Image-to-Image Translation." arXiv preprint arXiv:2008.00951 (Apr. 21, 2021), pp. 1-21 (Year: 2021).*

Xu, Wenju, et al. "Stacked Wasserstein Autoencoder." Neurocomputing 363 (2019), pp. 195-204 (Year: 2019).*

Y. Li, K. K. Singh, U. Ojha and Y. J. Lee, "MixNMatch: Multifactor Disentanglement and Encoding for Conditional Image Generation,"2020 IEEE/CVF Conference on Computer Vision and Pattern Recognition (CVPR), Seattle, WA, USA, 2020, pp. 8036-8045, (Year : 2020).*

Richardson et al., Encoding in Style: a StyleGAN Encoder for Image-to-Image Translation, arXiv:2008.00951v2 [cs.CV] Apr. 21, 2021 (Year: 2021).*

International Search Report mailed Jul. 10, 2023 for International Application No. PCT/SG2022/050801 (4 pages).

* cited by examiner

PORTRAIT STYLIZATION FRAMEWORK TO CONTROL THE SIMILARITY BETWEEN STYLIZED PORTRAITS AND ORIGINAL PHOTO

BACKGROUND

Portraiture, the art of depicting the appearance of a subject, is an important art form dating back to the beginning of civilization. It has evolved beyond faithful depiction into more creative interpretations with a plethora of styles, such as abstract art, Cubism and cartoon. Automatically stylized portraiture has undergone rapid progress in recent years due to advances in deep learning. Early methods involving neural style have convincingly demonstrated the ability to transfer textural styles from an exemplar source to target images, with real photos transformed into Van Gogh or Picasso paintings. However, when it comes to portraiture, these methods largely failed to capture the important geometry-dependent motifs of different portraiture styles, thus falling short in stylization quality.

Image-to-image translation methods were later introduced to "translate" images from a source domain to a target domain using paired datasets in a supervised manner or using unpaired datasets in an unsupervised setting. These methods have been explored for portrait stylization, e.g., self-to-anime and cartoon. However, supervised approaches require paired datasets for training that would be manually onerous if not infeasible, while the unsupervised approaches not only need a large amount of unpaired data, but also often face difficulties with stable training convergence and in generating high-resolution results. Moreover, in portrait stylization applications, some of the largest challenges occur when balancing between "stylization" and "personalization." The more stylization applied to an image, such as a photo, from a source domain, the more a resulting portrait tends to look less like the subject in the original photo. The more personalization that is maintained in an image, the less a portrait tends to include a stylized subject in the result, thus frustrating the goal of portrait stylization.

It is with respect to these and other general considerations that embodiments have been described. Although relatively specific problems have been discussed, the examples described herein should not be limited to solving the specific problems identified in the background above.

SUMMARY

As disclosed herein, portrait stylization may be blended with other StyleGAN-based methods to allow a user to interactively determine a personalized amount of stylization and personalization that is applied to an input image. In examples, a latent code of a portrait stylization model may be blended with latent code of another StyleGAN-based method. Thus, a user may be able to choose which portion of the latent code is blended and which portion of the latent code is not blended. In some examples, a user may be provided an input option to provide an amount of stylization vs personalization. In examples, weights associated with different latent code portions may be established to control an amount of latent code blending that occurs. Thus, accessories, such as glasses or other personalized accessories may appear in a final stylized portrait, whereas resulting portraits made with previous stylization techniques may lack the glasses or other personalized accessories.

In some examples, an AgileGAN framework is implemented that generates high quality stylistic portraits via inversion-consistent transfer learning. The AgileGAN framework includes a hierarchical variational autoencoder; the hierarchical variational autoencoder generates an inverse mapped distribution that conforms to the original latent Gaussian distribution provided by a StyleGAN-based network, while augmenting the original latent space to a multi-resolution latent space to provide encoding for different levels of detail. Accordingly, the latent code provided by the StyleGAN-based network may be blended with a latent code provided by another StyleGAN-based network, such as PSP and OPT. Additional information about GAN networks, including StyleGAN-based networks and StyleGAN2, can be found in the following printed papers: "A Style-Based Generator Architecture for Generative Adversarial Networks" to T. Karras, S. Laine, and T. Aila., in Proc. IEEE/CVF Conference on Computer Vision and Pattern Recognition, 2019 and "Analyzing and Improving the Image Quality of StyleGAN" to T. Karras, S. Laine, M. Aittala, J. Hellsten, J. Lehtinen, and T. Aila, in Proc. IEEE/CVF Conference on Computer Vision and Patter Recognition, 2020 both of which are incorporated herein by reference, for all that they teach and all purposes.

In accordance with at least one example of the present disclosure, a method for generating a stylized image is described. The method may include receiving an input image, generating, using a first encoder, a first latent code based on the input image, generating, using a second encoder, a second latent code based on the input image, blending the first latent code and the second latent code to obtain a blended latent code, generating, by a generative adversarial network generator, a stylized image based on the blended latent code and providing the stylized image as an output.

In accordance with at least one example of the present disclosure, a system for generating a stylized image is described. The system may include one or more hardware processors configured by machine-readable instructions to: receive an input image, generate, using a first encoder, a first latent code based on the input image, generate, using a second encoder, a second latent code based on the input image, blend the first latent code and the second latent code to obtain a blended latent code, generate, by a generative adversarial network generator, a stylized image based on the blended latent code, and provide the stylized image as an output.

In accordance with at least one example of the present disclosure, a computer-readable storage medium including instructions is described. The instructions, which when executed by a processor, cause the processor to: receive an input image, generate, using a first encoder, a first latent code based on the input image, generate, using a second encoder, a second latent code based on the input image, blend the first latent code and the second latent code to obtain a blended latent code, generate, by a generative adversarial network generator, a stylized image based on the blended latent code, and provide the stylized image as an output.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
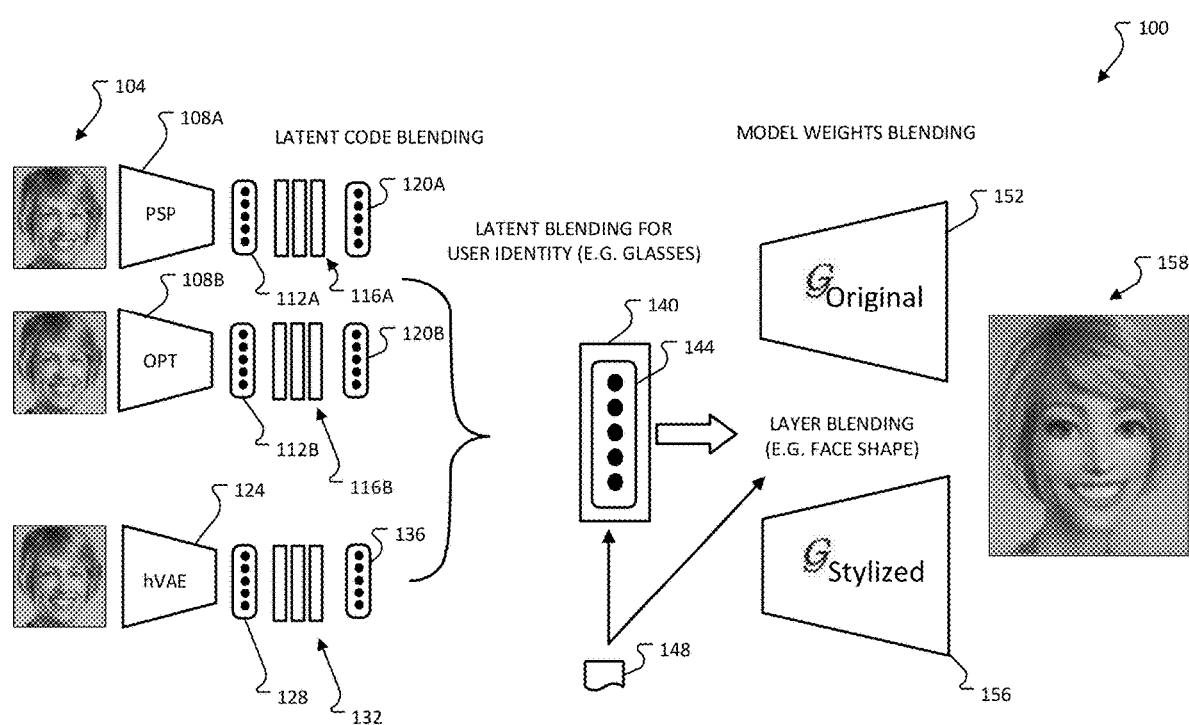
FIG. 1 depicts an exemplary dataflow of a stylized image generation system implementing the image stylization and blending methods in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Stylizing facial images in an artistic manner has been explored in the context of non-photorealistic rendering. Early approaches relied on low level histogram matching using linear filters. Neural style transfer, by matching feature statistics in convolutional layers, led to early exciting results via deep learning. Since then, several improvements directed to enforcing local patterns in deep feature space via a Markov random field (MRF) and extending style transfer to video and improved the quality by imposing temporal constraints have been proposed. Although these methods can achieve generally compelling results for several artistic styles, they usually fail on styles involving significant geometric deformation of facial features, such as cartoonization. For more general stylization, image-to-image (I2I) translation may be used to translate an input image from a source domain to a target domain.

Conditional generative adversarial networks (GAN) may be implemented to learn the input-to-output mapping. Similar ideas have been applied to various tasks, such as sketches-to-photographs and attribute-to-images. For example, the well-known cycle-consistency loss in Cycle-GAN has been proposed to improve network training stability for the unpaired setting. Unsupervised methods have also been used in cartoonization. Further, CycleGAN has been extended to cross-domain anime portrait generation, and other unsupervised methods have incorporated an attention module and a learnable normalization function for cartoon face generation, where their attention-guided model can flexibly control the amount of change in shape and texture. GANs have been used to synthesize images that ideally match the training dataset distribution via adversarial training. GANs have been applied to various areas, including but not limited to image inpainting, image manipulation, and texture synthesis. Various advancements have been made to improve the architecture, synthesis quality, and training stability of GANs.

Since GANs are typically designed to generate realistic images by sampling from a known distribution in latent space, GAN inversion addresses the complementary problem of finding the most accurate latent code, when given an input image, that will reconstruct that image. One approach is based on optimization, which is directly optimizing the latent code to minimize the pixel-wise reconstruction loss for a single input instance. Another approach is learning-based, in which a deterministic model is trained by minimizing the difference between the input and synthesized images. Other works combine these the optimization and learning-based approaches by learning an encoder that produces a good initialization for subsequent optimization. In addition to image reconstruction, some examples also use inversion when undertaking image manipulation. For example, a hybrid method may encode images into a semantic manipulable domain for image editing. In addition, a generic Pixel2Style2Pixel (PSP) encoder has been proposed; such an encoder is based on a dedicated identity loss for embedding images in several real image translation tasks, such as inpainting and super resolution.

As previously mentioned, finding a best inversion mapping in terms of reconstruction in an original GAN network may be misguided, because what may be best for realistic image generators may not be best for other stylized generators. Instead, a learned inversion mapping that also optimizes for matching the distribution of latent codes to the Gaussian latent distribution in the original StyleGAN2 may lead to better results across a range of different stylized generators. In other words, matching latent distributions when learning the inversion leads to robust embedding across different styles, and is better than aiming for the best reconstruction embedding for realistic images.

FIG. 1 depicts an example of a dataflow process 100 for obtaining a generated image utilizing a latent code blending operation. In examples, two or more image encoding processes may be utilized to map an input image into two separate respective latent codes using separate latent spaces. For example, an input image 104 may be provided to at least one of a first encoder 108A and/or a second encoder 108B. Each of the encoders 108A and 108B may encode the input image 104 into respective first and second latent codes 112A and 112B. The first and second latent codes 112A and 112B may be mapped to respective less entangled W codes 120A and 120B through respective Multi-Layer Perceptrons (MLP) f 116A and 116B. The image 104 may be provided to another encoder 124. The encoder 124 may encode the input image 104 into latent code 128. The latent code 128 may then be mapped to respective less entangled W code 136 through a Multi-Layer Perceptron (MLP) f 132. The latent code 136 and at least one of the latent codes 120A and/or 120B may be blended at a latent code blender 140 thereby generating latent code 144. In examples, an amount of blending 148 may be received at the latent code blender 140 and may control or influence an amount of blending that occurs between the pre-trained model 124 and at least one of the models 108A and/or 108B, thereby controlling or influencing an amount of personalization vs stylization that results from the latent code blending.

In examples, the model 108A may correspond to a model configured to generate a latent code 112A. An example of the model 108A may include a Pixel2Style2Pixel (PSP) encoder. The PSP encoder may be based on a dedicated identity loss for embedding images in several real image translation tasks, such as inpainting and super resolution. While the PSP encoder may be utilized to generate a latent code, the process used by the PSP encoder for single domain manipulation and/or reconstruction may not be directly applicable to cross-domain generation due in part to insufficient consistency in the latent distribution. In examples, the model 108B may correspond to a model configured to generate a latent code 112B. An example of the model 108B may be an optimization encoder. The optimization encoder may directly optimize the late code to minimize pixel-wise reconstruction loss for a single input instance. In some examples, the encoder 108B may be learning based and utilize a deterministic model trained by minimizing the differences between the input mange and synthesized images.

In some examples, the model 124 may correspond to a StyleGAN2 model configured to generate a latent code 128. In examples, the model 124 may utilize a hierarchical variational autoencoder (hVAE) that ensures the latent code mapping conforms to a multi-variate Gaussian distribution, as further described in U.S. patent application Ser. No. 17/321,384, entitled "A High-Resolution Portrait Stylization Frameworks Using A Hierarchical Variational Encoder", the contents of which is hereby incorporated herein by reference for all that it teaches and for all purposes. Thus, while the model 124 may provide more of a stylization component to a generated output image, the one or more models 108A and/or 108B may provide more of a personalization component to a generated output image. Accordingly, the amount of personalization vs stylization may be controlled or otherwise influenced at the latent code blender 140 based on the amount of blending 148. As previously mentioned, the amount of blending 148 may be received at the latent code blender 140 and may control or influence an amount of blending of the stylization and/or personalization that is provided from the latent codes 116A and/or 116B and 132. For example, where an amount of blending indicates more stylization is to result, the latent code blender 140 may utilize more of the latent code 136 or otherwise more heavily weight the latent code 136 than the latent codes 116A and/or 116B when generating the blended latent code 144. Where an amount of blending indicates more personalization is to result, the latent code blender 140 may utilize more of the latent code 116A and/or 116B or otherwise more heavily weight the latent code 116A and/or 116B than the latent codes 136 when generating the blended latent code 144.

In some examples, the amount of personalization vs stylization may be specific to a portion of the latent code 132 and/or 116A/116B and may be controlled or otherwise influenced at the latent code blender 140 based on the amount of blending 148. That is, the amount of blending 148 may be received at the latent code blender 140 and may control or influence an amount of blending of the stylization and/or personalization for a specific portion of the latent code. For example, where an amount of blending indicates one or more attributes of stylization are to result, the latent code blender 140 may more heavily weight a portion of the latent code 136 corresponding to the one or more attributes of stylization than the portion of the latent codes 116A and/or 116B when generating the blended latent code 144. Where an amount of blending indicates one or more attributes of personalization are to result, the latent code blender 140 may more heavily weight a portion of the latent code 116A and/or 116B corresponding to the attributes of personalization than the portion of the latent code 136 when generating the blended latent code 144.

In accordance with examples of the present disclosure, transfer learning may be used to train the stylized generator 156. As artistic portraits share obvious perceptual correspondences to real portraits, a GAN model pre-trained on a dataset may provide initialization weights for fine-tuning the stylized generator 156. Accordingly, the stylized generator 156 may be fine-tuned on a smaller stylized dataset using transfer learning from the pre-trained GAN generator 152. In some examples, one or more layers of a generator may be swapped and/or blended with one or more layers of the stylized generator 156. For example, one or more layers of a pre-trained generator corresponding to the pre-trained GAN generator 152 may be swapped or blended with one or more layers of the stylized generator 156 such that the stylized generator 156 may generate output images having stronger personalization characteristics than stylization characteristics for some features. By swapping or blending layers of GAN models, low- and high-resolution features from each of the models can be selected and used when generating an output image. In examples, the amount of blending 148 may also include an indication identifying which layers of the GAN generator 152 are to be swapped or otherwise used in the stylized GAN generator 156. Alternatively, or in addition, the amount of blending 148 may include an indication identifying which layers of the GAN generator 152 are to be blended with identified layers in the stylized GAN generator 156. Alternatively, or in addition, the amount of blending 148 may include an indication identifying which features are to be more influenced by the GAN generator 152. In accordance with examples of the present disclosure, the stylized GAN generator 156 may sample or otherwise receive the latent code 144 and generate an output image 158.

Figure 2:
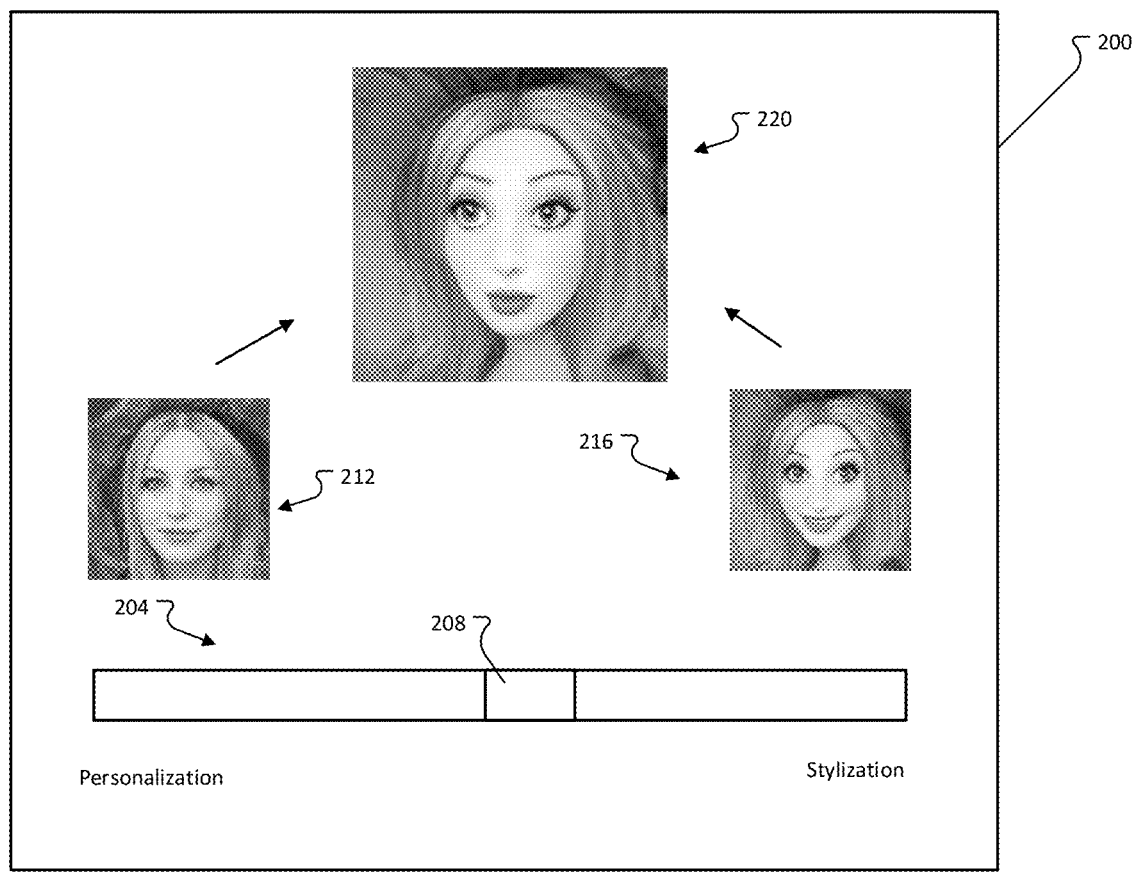
FIG. 2 depicts an example user interface in accordance with examples of the present disclosure.

FIG. 2 depicts an example user interface 200 in accordance with examples of the present disclosure. The example user interface 200 may include a control 204, such as a slider, allowing a user to interact with the control 204 in order to provide an indication of an amount of stylization or personalization. For example, a GAN generator, such as the GAN generator 156, may be more influenced by stylization as indicated by the position 208 of the control 204. In examples, the user interface 200 may include a result of a generated personalized image 212 (e.g., no stylization all personalization) and a result of a stylized image 216 (e.g., no personalization and all stylization). The image 220 may correspond to a result of blending the latent code as previously discussed and/or swapping or blending layers of the GAN generator as previously discussed and corresponding to the position 208 of the control 204.

Figure 3:
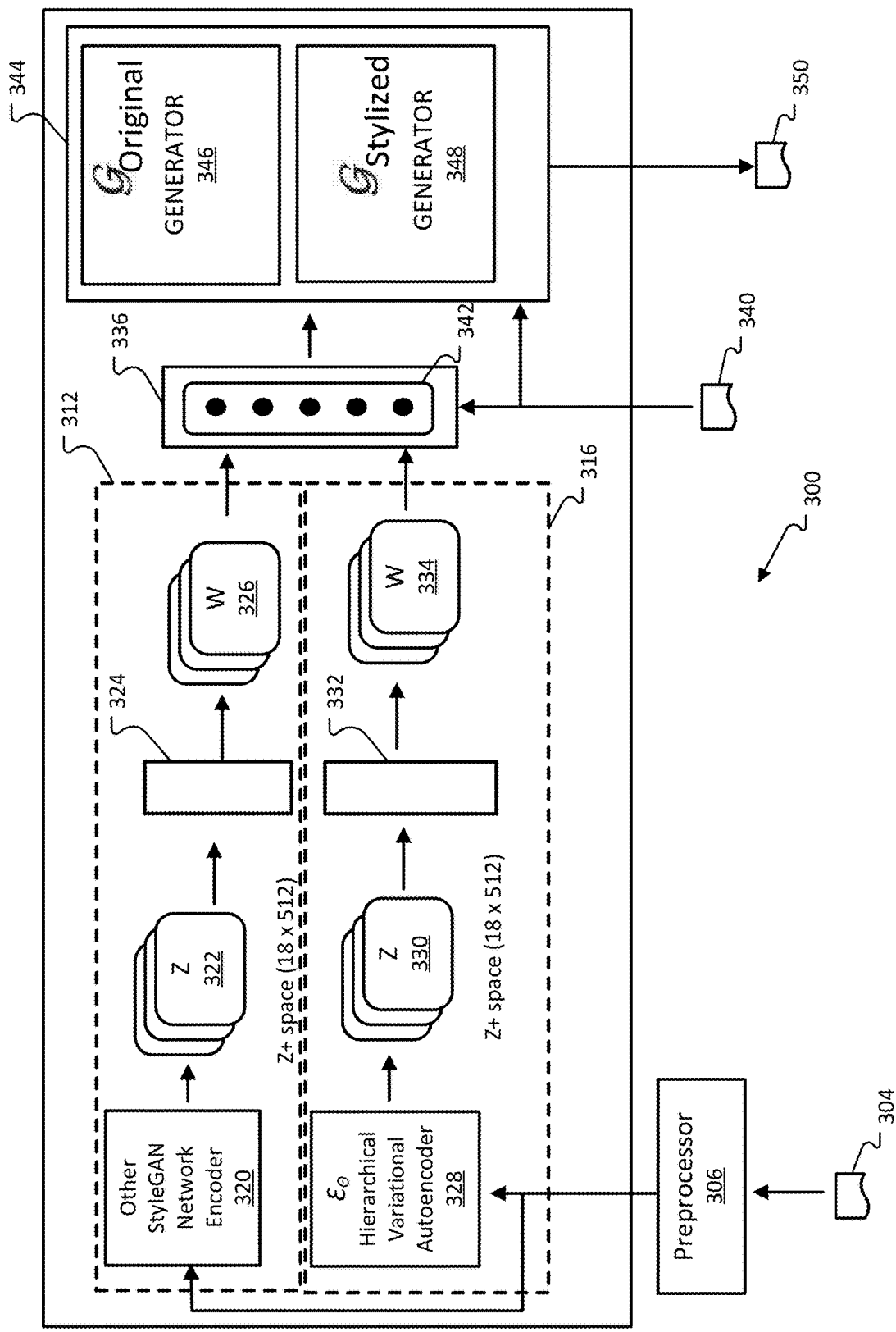
FIG. 3 depicts an exemplary processing or computing device capable of implementing the image stylization and blending methods for the stylized image generation system in accordance with examples of the present disclosure.

FIG. 3 depicts additional details of a dataflow process 300 for obtaining a generated image utilizing a latent code blending operation. The dataflow process 300 may be the same as or similar to the dataflow process 100 (FIG. 1). In the example dataflow process 300, two or more image encoding processes (e.g., 312 and 316) may be utilized to map an input image 304 into two separate respective latent codes using different latent spaces. More specifically, the input image 304 may be preprocessed at the preprocessor 306 where the preprocessor 306 warps and/or normalizes the input image 304 into a specified resolution. In some examples, the resolution may be 256×256. The warped and/or normalized input image 304 may be provided to two encoders configured to generate latent codes based on the input. In examples, a first encoder 320 may receive the warped and/or normalized input image 304 and encode the input image 304 into a first latent code 322. In examples, the first encoder 320 may correspond to a StyleGAN network encoder, such as but not limited to a PSP encoder and/or an optimization encoder as previously discussed. The encoder 320 may generate a latent code 322; in examples, the latent space used to generate the latent code 322 may include a plurality of layers, each layer corresponding to a different resolution of encoding. Accordingly, a Z space may be referred to as a Z+ space having multiple stacked layers of the latent space. The latent code 322 may then be provided to a Multi-Layer Perceptron 324 to map the latent code 322 to a less entangled latent code 326 using a W space. Similar to the Z+ space, the W space may comprise a plurality of layers such that the W space may be referred to as a W+. In examples, the latent code 326 may be provided to a latent code blender 336.

In examples, a second encoder 328 may receive the warped and/or normalized input image 304 and encode the input image 304 into a second latent code 330. In examples, the second encoder 328 may correspond to a hierarchical variational autoencoder as previously discussed. The encoder 328 may generate a latent code 330 using a latent space; in examples, the latent space may include a plurality of layers, each layer corresponding to a different resolution of encoding. Accordingly, a Z space may be referred to as a Z+ space having multiple stacked layers of the latent space. The latent code 330 may then be provided to a Multi-Layer Perceptron 332 to map the latent code 330 to a less entangled latent code 334 using a W space. Similar to the Z+ space, the W space may comprise a plurality of layers such that the W space may be referred to as a W+. In examples, the latent code 334 may be provided to a latent code blender 336.

While the encoder 328 may provide more of a stylization component to a generated output image, the encoder 320 may provide more of a personalization component to a generated output image. Accordingly, the amount of personalization vs stylization may be controlled or otherwise influenced at the latent code blender 336 based on the amount of blending 340. As previously mentioned, the amount of blending 340 may be received at the latent code blender 336 and may control or influence an amount of blending of the stylization and/or personalization that is provided from the latent codes 326 and 334. For example, where an amount of blending indicates more stylization is to result, the latent code blender 336 may utilize more of the latent code 334 or otherwise more heavily weight the latent code 334 than the latent code 326 when generating the blended latent code 342. Where an amount of blending indicates more personalization is to result, the latent code blender 336 may utilize more of the latent code 326 or otherwise more heavily weight the latent code 326 than the latent code 334 when generating the blended latent code 342.

In some examples, the amount of personalization vs stylization may be specific to a portion of the latent code 326 and/or 334 and may be controlled or otherwise influenced at the latent code blender 336 based on the amount of blending 340. That is, the amount of blending 340 may be received at the latent code blender 336 and may control or influence an amount of blending of the stylization and/or personalization for a specific portion of the latent code. For example, where an amount of blending indicates one or more attributes of stylization are to result, the latent code blender 336 may more heavily weight a portion of the latent code 334 corresponding to the one or more attributes of stylization than the portion of the latent code 326 when generating the blended latent code 342. Where an amount of blending indicates one or more attributes of personalization are to result, the latent code blender 336 may more heavily weight a portion of the latent code 326 corresponding to the attributes of personalization than the portion of the latent code 334 when generating the blended latent code 342.

In accordance with examples of the present disclosure, a generator 344 may sample or otherwise receive the blended latent code 342 and generate a final image 350 based on the blended latent code 342. In examples, transfer learning may be used to train the generator 344, where the generator 344 may include a stylized generator 348. Accordingly, the generator 344 may be fine-tuned on a smaller stylized dataset using transfer learning from the pre-trained GAN generator 346. In some examples, the generator 344 may include layers from the pre-trained GAN generator 346. That is, the generator 344 may include layers form a pre-trained GAN generator 346 and layers from a stylized generator 348 trained using transfer learning.

Thus, one or more layers of a pre-trained generator corresponding to the pre-trained GAN generator 346 and one or more layers of the stylized generator 348 may be included in the generator 344 such that the generator 344 may generate output images having stronger personalization characteristics than stylization characteristics for some features. In some examples, the generator 344 may be obtained by swapping or blending layers of the stylized generator 348 for layers of the original generator 346. In some examples, low- and high-resolution features from each of the models (e.g., 346 and 348) can be selected and used when generating an output image. In examples, the amount of blending 340 may also include an indication identifying which layers of the GAN generator 346 are to be included in the generator 344 and which layers of the stylized GAN generator 348 are to be included in the generator 344. In some examples, instead of including layers from either the GAN generator 346 or the stylized GAN generator 348, the amount of blending 340 may indicate how much of each layer from each of the models (e.g., 346 and 348) are to be blended. Alternatively, or in addition, the amount of blending 340 may include an indication identifying which features corresponding to one or more layers are to be more influenced by the GAN generator 346 or the stylized generator 348. Thus, the generator 344 may sample or otherwise receive the latent code 342 and generate an output image 350.

Figure 4:
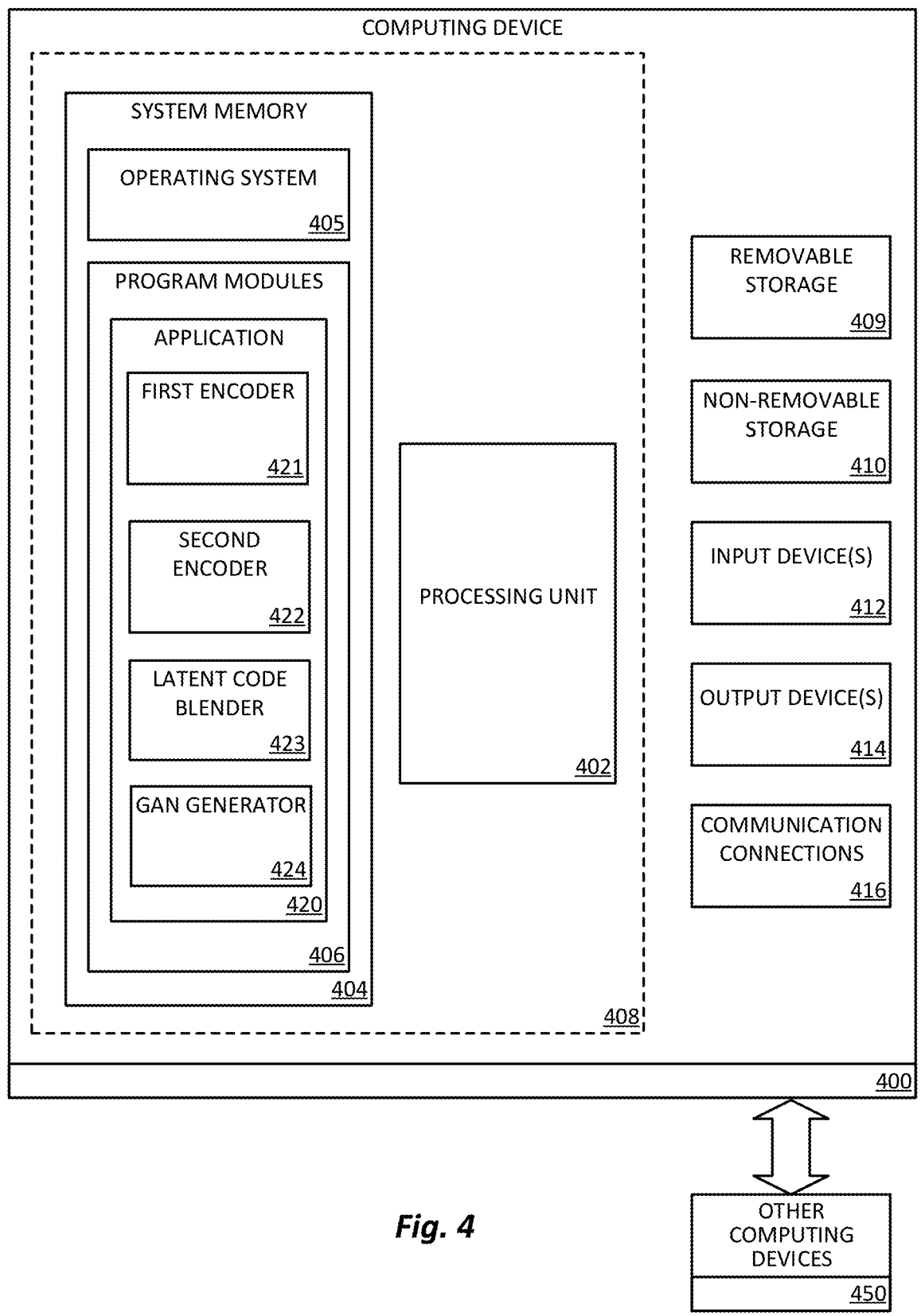
FIG. 4 depicts a block diagram illustrating physical components (e.g., hardware) of a computing system with which aspects of the disclosure may be practiced.

FIG. 4 is a block diagram illustrating physical components (e.g., hardware) of a computing system 400 with which aspects of the disclosure may be practiced. The computing device components described below may be suitable for the computing and/or processing devices described above. In a basic configuration, the computing system 400 may include at least one processing unit 402 and a system memory 404. Depending on the configuration and type of computing device, the system memory 404 may comprise, but is not limited to, volatile storage (e.g., random-access memory (RAM)), non-volatile storage (e.g., read-only memory (ROM)), flash memory, or any combination of such memories.

The system memory 404 may include an operating system 405 and one or more program modules 406 suitable for running software application 420, such as one or more components supported by the systems described herein. As examples, system memory 404 may include a first encoder 421, a second encoder 422, a latent code blender 423, and/or a GAN generator 424. The first encoder 421 may be the same as or similar to the encoder 108A, 108B, and/or 320 as previously described. The second encoder 422 may be the same as or similar to the encoder 124 and/or the encoder 328 as previously described. The latent code blender may be the same as or similar to the latent code blender 140 and/or 336 as previously described. The GAN generator may be the same as or similar to the GAN generator 156 and/or 344 as previously described. The operating system 405, for example, may be suitable for controlling the operation of the computing system 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing system 400 may have additional features or functionality. For example, the computing system 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., software applications 420) may perform processes including, but not limited to, the aspects, as described herein. Other program modules may be used in accordance with aspects of the present disclosure.

Furthermore, examples of the disclosure may be practiced in an electrical circuit discrete electronic element, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 400 may also have one or more input device(s) 412 such as a keyboard, a mouse, a pen, a sound or voice input device, a touch or swipe input device, etc. The one or more input device 412 may include an image sensor. The output device(s) 414 such as a display, speakers, a printer, etc. may also be included. The aforementioned devices are examples and others may be used. The computing system 400 may include one or more communication connections 416 allowing communications with other computing devices/systems 450 as shown in FIG. 4. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing system 400. Any such computer storage media may be part of the computing system 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5:
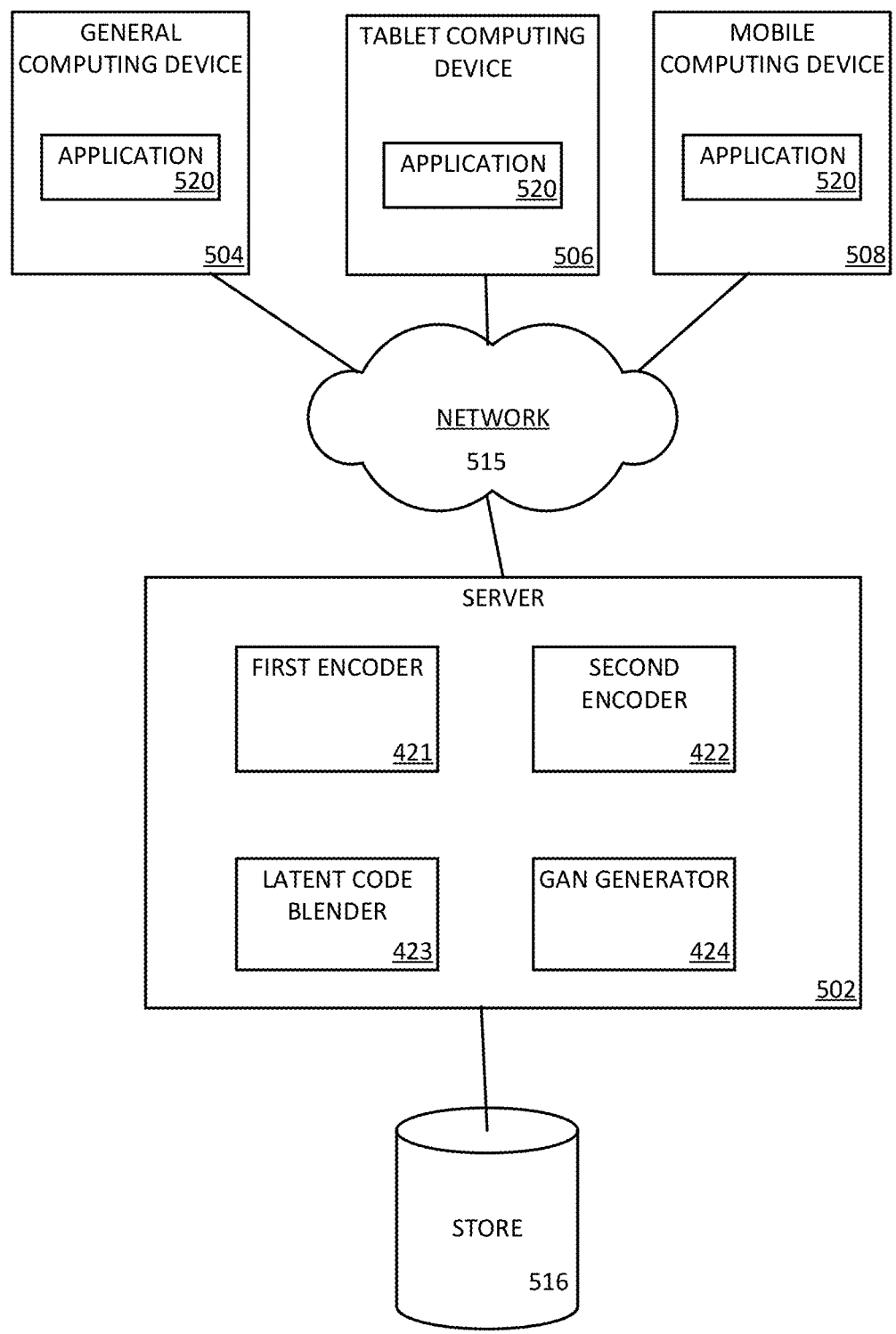
FIG. 5 illustrates one aspect of the architecture of a system for processing data.

FIG. 5 illustrates one aspect of the architecture of a system for processing data received at a computing system from a remote source, such as a personal computer 504, tablet computing device 506, or mobile computing device 508. The personal computer 504, tablet computing device 506, or mobile computing device 508 may include one or more applications 520; such applications may include but are not limited to the first encoder 421, the second encoder 422, the latent code blender 423, and/or the GAN generator 424. Content at a server device 502 may be stored in different communication channels or other storage types. For example, various documents may be stored using a directory service, a web portal, a stylized image service, an instant messaging store, or social networking services.

One or more of the previously described program modules 406 or software applications 420 may be employed by server device 502 and/or the personal computer 504, tablet computing device 506, or mobile computing device 508, as described above. For example, the server device 502 may include the first encoder 421, the second encoder 422, the latent code blender 423, and/or the GAN generator 424 previously described.

The server device 502 may provide data to and from a client computing device such as a personal computer 504, a tablet computing device 506 and/or a mobile computing device 508 (e.g., a smart phone) through a network 515. By way of example, the computer system described above may be embodied in a personal computer 504, a tablet computing device 506 and/or a mobile computing device 508 (e.g., a smart phone). Any of these examples of the computing devices may obtain content from the store 516, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
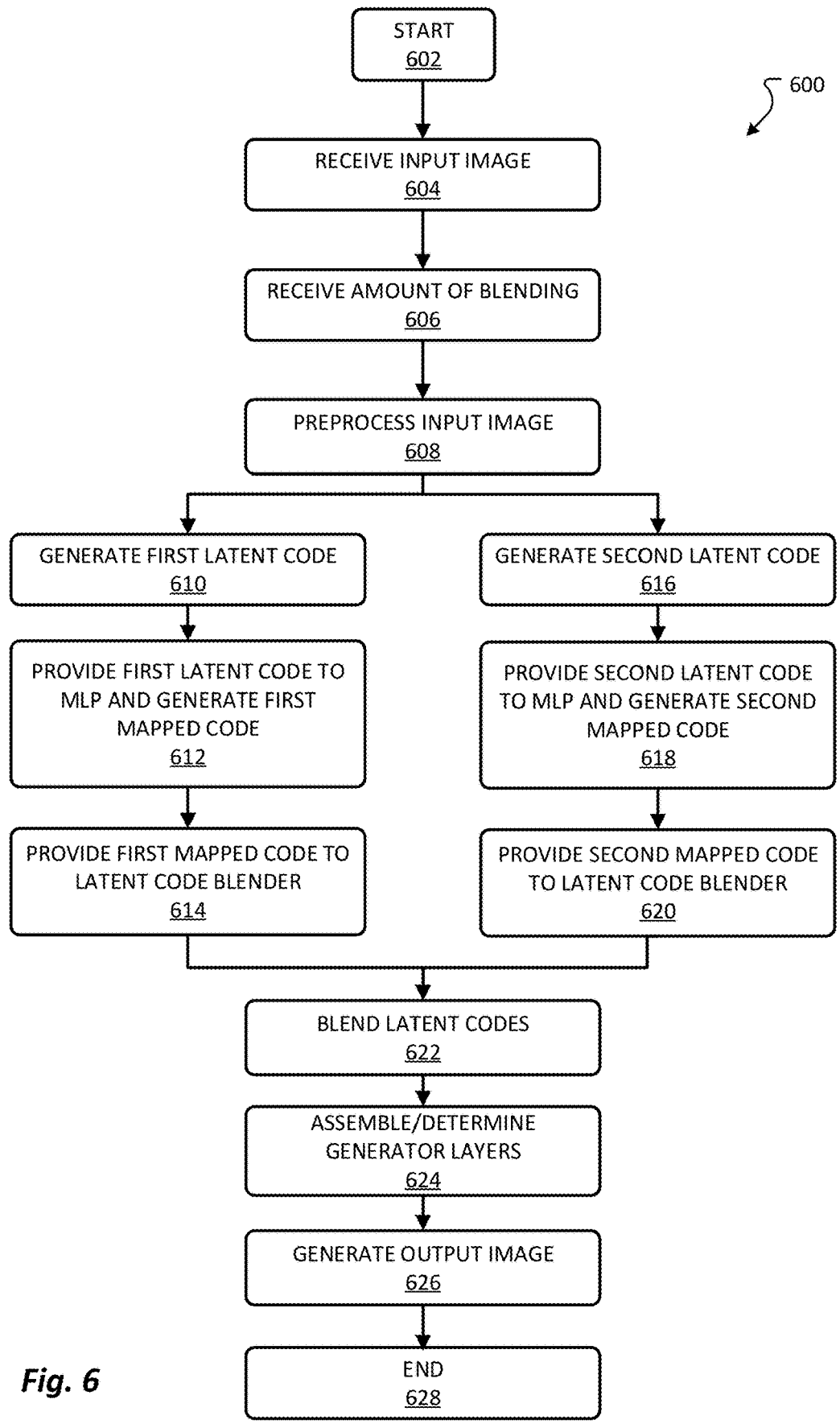
FIG. 6 depicts details of a method for generating a stylized image from an input image in accordance with examples of the present disclosure.

FIG. 6 depicts an exemplary method 600 for controlling a similarity between stylized portraits and an original photo in accordance with examples of the present disclosure. A general order for the steps of the method 600 is shown in FIG. 6. Generally, the method 600 starts at 602 and ends at 628. The method 600 may include more or fewer steps or may arrange the order of the steps differently than those shown in FIG. 6. The method 600 can be executed as a set of computer-executable instructions executed by a computer system and encoded or stored on a computer readable medium. In examples, aspects of the method 600 are performed by one or more processing devices, such as a computer or server. Further, the method 600 can be performed by gates or circuits associated with a processor, Application Specific Integrated Circuit (ASIC), a field programmable gate array (FPGA), a system on chip (SOC), a neural processing unit, or other hardware device. Hereinafter, the method 600 shall be explained with reference to the systems, components, modules, software, data structures, user interfaces, etc. described in conjunction with FIGS. 1-5.

The method 600 starts at 602, where flow may proceed to 604. At 604, an input image may be received. For example, a user may provide an input image and/or a system may select an input image from a storage location. At 606, an amount of blending may be received. In examples, the amount of blending may correspond to an amount of latent code blending, for example by a latent code blender. In some examples, the amount of latent code blending may correspond to one or more specific features; in some examples, the amount of blending may correspond to an amount of stylization vs personalization. For example, a value associated with a control, such as the control 204 (FIG. 2) may be received at 606. At 608, the input image may be preprocessed as previously described.

The method may proceed to 610, where the preprocessed input image may be provided to a first encoder and the first encoder may encode the input image into a first latent encoding or code using a first latent space. In examples, the first encoder may correspond to a StyleGAN network encoder, such as but not limited to a PSP encoder and/or an optimization encoder as previously discussed. The first encoder may generate a first encoding or code corresponding to a first latent space; in examples, the first latent space may include a plurality of layers, each layer corresponding to a different resolution of encoding. Accordingly, a Z space may be referred to as a Z+ space having multiple stacked layers of the first latent space. At 612, the latent encoding or code generated by the first encoder may be provided to a first Multi-Layer Perceptron and mapped to a first encoding or code in the first less entangled latent space referred to as the W space. Similar to the Z+ space, the W space may comprise a plurality of layers such that the W space may be referred to as a W+. In examples, the first mapped encoding or code from the W or W+ space may be provided to the latent code blender at 614.

The method 600 may similarly proceed to 616, where the preprocessed input image may be provided to a second encoder such that the second encoder encodes the input image into a second latent space encoding or code using a second latent space. In examples, the second encoder may correspond to a hierarchical variational autoencoder as previously described. The second encoder may generate a second encoding or code corresponding to a second latent space; in examples, the second latent space may include a plurality of layers, each layer corresponding to a different resolution of encoding. Accordingly, a Z space may be referred to as a Z+ space having multiple stacked layers of the second latent space. At 618, the latent encoding or code generated by the second encoder may be provided to a second Multi-Layer Perceptron and mapped to a second encoding or code in the second less entangled latent space referred to as the W space. Like the Z+ space, the W space may comprise a plurality of layers such that the W space may be referred to as a W+. In examples, the second mapped encoding or code from the W or W+ space may be provided to the latent code blender at 620.

At 622, the late code blender may blend the first mapped encoding or code with the second mapped encoding or code. While the second encoder may provide more of a stylization component to a generated output image, the first encoder may provide more of a personalization component to a generated output image. Accordingly, the amount of personalization vs stylization may be controlled or otherwise influenced at the latent code blender based on the amount of blending received at 606. As previously mentioned, the amount of blending may be received at the latent code blender and may control or influence an amount of blending of the stylization and/or personalization that is provided based on the first and second mapped encodings or codes.

In accordance with examples of the present disclosure, based on an amount of blending received at 606, one or more layers of a GAN generator and one or more layers of a stylization generator may be swapped and/or blended as previously described. As previously discussed, layers of pre-trained GAN generators may be assembled at 624 based on the amount of blending. In some examples, no blending is required, and the generator is a pre-trained GAN stylized generator trained utilizing transfer learning from another GAN generator and fine-tuned with a stylized dataset. In some examples, no blending is required, and the generator is a pre-trained GAN generator trained on a full dataset. In other examples, one or more layers of the stylized GAN generator may be replaced with one or more layers of the pre-trained GAN generator that is trained on a full dataset. At 626, an output image may be generated by the GAN generator having the specified layers as provided above. The method 600 may then end at 628.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The present disclosure relates to systems and methods for generating a stylized image according to at least the examples provided in the sections below:

(A1) In one aspect, some examples include a method for generating a stylized image. The method may include: receiving an input image, generating, using a first encoder, a first latent code based on the input image, generating, using a second encoder, a second latent code based on the input image, blending the first latent code and the second latent code to obtain a blended latent code, generating, by a generative adversarial network generator, a stylized image based on the blended latent code and providing the stylized image as an output.

(A2) In some examples of A1, the method further includes: receiving a blending parameter indicating an amount to blend the first latent code with the second latent code.

(A3) In some examples of A1-A2, the method further includes: receiving a blending parameter indicating one or more layers of a first pre-trained GAN generator are to be used in the GAN generator; assembling the GAN generator based on the blending parameter and the one or more layers of the pre-trained GAN generator; and generating the stylized image using the assembled GAN generator.

(A4) In some examples of A1-A3, the GAN generator is a trained GAN generator trained via transfer learning from the first pre-trained GAN generator.

(A5) In some examples of A1-A4, the first encoder is a PSP encoder.

(A6) In some examples of A1-A5, the second encoder is a variational hierarchical autoencoder.

(A7) In some examples of A1-A6, the method further includes: generating the first latent code from a first multilayer perceptron; and generating the second latent code from a second multilayer perceptron.

In yet another aspect, some examples include a computing system including one or more processors and memory coupled to the one or more processors, the memory storing one or more instructions which when executed by the one or more processors, causes the one or more processors perform any of the methods described herein (e.g., A1-A7 described above).

In yet another aspect, some examples include a non-transitory computer-readable storage medium storing one or more programs for execution by one or more processors of a storage device, the one or more programs including instructions for performing any of the methods described herein (e.g., A1-A7 described above).

Advantages in implementing the methods and systems as disclosed herein include the capability of producing a blended and stylized image with a variable amount of structure based on a pre-trained GAN generator. Therefore, an amount of stylization vs. personalization may influence the resulting generated image.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for generating a stylized image, the method comprising:
   receiving an input image;
   generating, using a first encoder, a first latent code based on the input image;
   generating, using a second encoder, a second latent code based on the input image;
   causing a user interface to be displayed;
   receiving, via input to the user interface, a blending parameter indicating an amount to blend the first latent code with the second latent code;
   blending the first latent code and the second latent code to obtain a blended latent code;
   generating, by a generative adversarial network (GAN) generator, a stylized image based on the blended latent code; and
   providing the stylized image as an output.

2. The method of claim 1, further comprising:
   receiving a blending parameter indicating one or more layers of a first pre-trained GAN generator are to be used in the GAN generator;
   assembling the GAN generator based on the blending parameter and the one or more layers of the pre-trained GAN generator; and
   generating the stylized image using the assembled GAN generator.

3. The method of claim 2, wherein the GAN generator is a trained GAN generator trained via transfer learning from the first pre-trained GAN generator.

4. The method of claim 1, wherein the first encoder is a PSP encoder.

5. The method of claim 1, wherein the second encoder is a variational hierarchical autoencoder.

6. The method of claim 1, further comprising:
   generating the first latent code from a first multilayer perceptron; and
   generating the second latent code from a second multilayer perceptron.

7. A system, comprising:
one or more hardware processors configured by machine-readable instructions to:
  receive an input image;
  generate, using a first encoder, a first latent code based on the input image;
  generate, using a second encoder, a second latent code based on the input image;
  cause a user interface to be displayed;
  receive, via input to the user interface, a blending parameter indicating an amount to blend the first latent code with the second latent code
  blend the first latent code and the second latent code to obtain a blended latent code;
  generate, by a generative adversarial network generator, a stylized image based on the blended latent code; and
  provide the stylized image as an output.

8. The system of claim 7, wherein the one or more hardware processors are further configured by machine-readable instructions to:
  receive a blending parameter indicating one or more layers of a first pre-trained GAN generator are to be used in the GAN generator;
  assemble the GAN generator based on the blending parameter and the one or more layers of the pre-trained GAN generator; and
  generate the stylized image using the assembled GAN generator.

9. The system of claim 8, wherein the GAN generator is a trained GAN generator trained via transfer learning from the first pre-trained GAN generator.

10. The system of claim 7, wherein the first encoder is a PSP encoder.

11. The system of claim 7, wherein the second encoder is a variational hierarchical autoencoder.

12. The system of claim 7, wherein the one or more hardware processors are further configured by machine-readable instructions to:
  generate the first latent code from a first multilayer perceptron; and
  generate the second latent code from a second multilayer perceptron.

13. A non-transitory computer-readable storage medium comprising instructions, which when executed by one or more processors, cause the one or more processors to:
  receive an input image;
  generate, using a first encoder, a first latent code based on the input image;
  generate, using a second encoder, a second latent code based on the input image;
  cause a user interface to be displayed;
  receive, via input to the user interface, a blending parameter indicating an amount to blend the first latent code with the second latent code
  blend the first latent code and the second latent code to obtain a blended latent code;
  generate, by a generative adversarial network generator, a stylized image based on the blended latent code; and
  provide the stylized image as an output.

14. The non-transitory computer-readable storage medium of claim 13, wherein the instructions, when executed by the one or more processors, cause the one or more processors to:
  receive a blending parameter indicating one or more layers of a first pre-trained GAN generator are to be used in the GAN generator;
  assemble the GAN generator based on the blending parameter and the one or more layers of the pre-trained GAN generator; and
  generate the stylized image using the assembled GAN generator.

15. The non-transitory computer-readable storage medium of claim 14, wherein the GAN generator is a trained GAN generator trained via transfer learning from the first pre-trained GAN generator.

16. The non-transitory computer-readable storage medium of claim 13, wherein the second encoder is a variational hierarchical autoencoder.

17. The non-transitory computer-readable storage medium of claim 13, wherein the instructions, when executed by the one or more processors, cause the one or more processors to:
  generate the first latent code from a first multilayer perceptron; and
  generate the second latent code from a second multilayer perceptron.

18. The method of claim 1, wherein the causing a user interface to be displayed comprises causing a control to be displayed on the user interface, and wherein the control is interactable to allow a user to provide the blending parameter via the control.

19. The method of claim 18, wherein the control is a slider.

20. The method of claim 18, further comprising causing the stylized image to be displayed on the user interface.

* * * * *